March 17, 1959 — J. H. EDMAN ET AL — 2,878,043
ADJUSTABLE LINK

Filed Dec. 1, 1955 — 3 Sheets-Sheet 1

INVENTORS.
JOHN H. EDMAN
EMIL F. JIRSA
BY
ATTORNEYS

March 17, 1959  J. H. EDMAN ET AL  2,878,043
ADJUSTABLE LINK
Filed Dec. 1, 1955  3 Sheets-Sheet 2

INVENTORS.
JOHN H. EDMAN
EMIL F. JIRSA
BY C. L. Parker  R. C. Johnson
ATTORNEYS

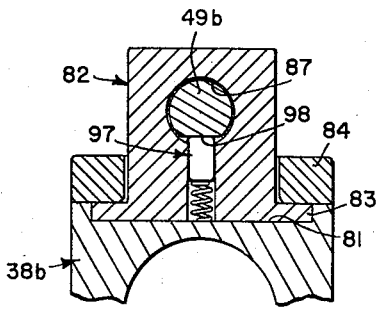
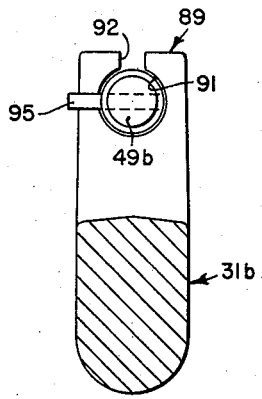
FIG. 9
FIG. 10
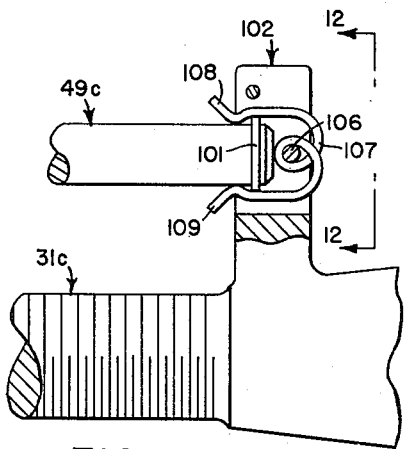
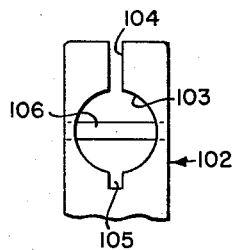
FIG. 11
FIG. 12
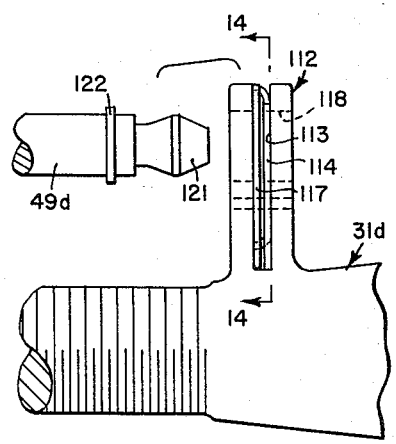
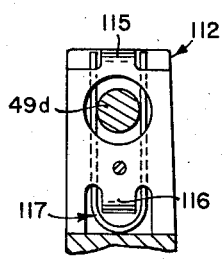
FIG. 13
FIG. 14
INVENTORS.
JOHN H. EDMAN
EMIL F. JIRSA
ATTORNEYS

United States Patent Office 2,878,043
Patented Mar. 17, 1959

2,878,043
ADJUSTABLE LINK

John H. Edman and Emil F. Jirsa, Waterloo, Iowa, assignors, by mesne assignments, to Deere & Company, a corporation of Delaware Application December 1, 1955, Serial No. 550,284

18 Claims. (Cl. 287—60)

The present invention relates generally to agricultural implements and more particularly to hitch devices for connecting agricultural implements to farm tractors.

The object and general nature of the present invention is the provision of a new and useful locking type quick adjustable link for use with agricultural implement hitch devices, particularly those commonly referred to as three-point hitches. More specifically, it is an object of this invention to provide a locking type quick adjustable top link which may be used, by virtue of its adjustability, to adjust the position of the implement relative to the tractor.

These and other objects and advantages of the present invention will be apparent to those skilled in the art after a consideration of the following detailed description, taken in conjunction with the accompanying drawings, in which:

Fig. 9 is a sectional view taken along the line 9—9 of Fig. 7.

Fig. 10 is a sectional view taken along the line 10—10 of Fig. 7.

Fig. 11 is a fragmentary elevation of the forward portion of a further modified form of top link, showing spring retaining means that may be substituted for the handle retaining means shown in Fig. 7.

Fig. 12 is a view taken along the line 12—12 of Fig. 11, the retaining spring being omitted.

Fig. 13 is a view similar to Fig. 11, showing a further modified form of handle retaining spring means.

Fig. 14 is a sectional view taken generally along the line 14—14 of Fig. 13.

Figure 1:
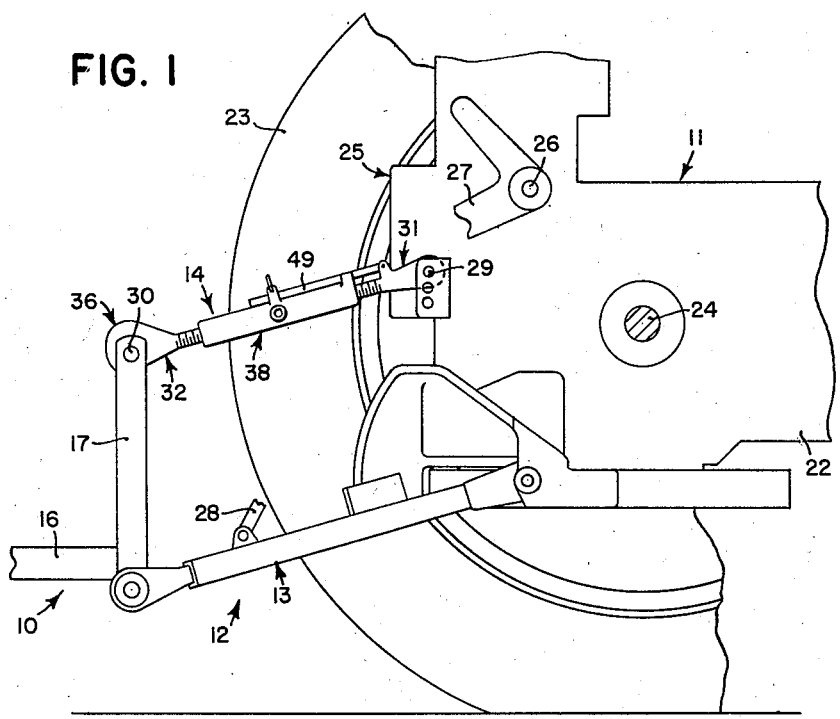
Fig. 1 is a fragmentary side view of the rear portion of a tractor and associated implement hitched thereto, in which the principles of the present invention have been incorporated.

Referring first to Fig. 1, the present invention is shown by way of illustration as incorporated in a hitch linkage of the generally well-known three-point type, arranged to connect an implement 10 to a propeller and supporting tractor 11. The hitch linkage is shown at 12 and incorporates a pair of lower draft links 13 and an upper or top link 14 with which the present invention is particularly concerned. The implement 10 may be any one of a variety or number of implements that are adapted to be connected with the tractor 11 through the hitch mechanism 12, the implement 10 being illustrated in Fig. 1 as a tractor-mounted plow which includes frame means 16 having at its forward end a vertically extending mast section 17.

The tractor 11 is of generally conventional construction so far as the principles of the present invention are concerned, the tractor 11 embodying a main frame and transmission housing 22, rear drive wheels 23 mounted on axle shafts 24 and a power lift unit 25 that includes a transverse rockshaft 26 to the ends of which lift arms 27 are connected, one at each side of the tractor. The lift arms 27 are connected to lift links 28 with the lower draft links 13.

The front end of the top link 14 is connected with the tractor by means 29 forming a connection that accommodates both lateral and vertical swinging of the top link 14 relative to the tractor, but rotation of the latter member about a generally fore-and-aft axis is prevented. The rear end of the link means 14 is similarly connected with the implement mast section 17, by means 30 that accommodates both lateral and vertical swinging, the means 30 being detachable.

Figure 2:
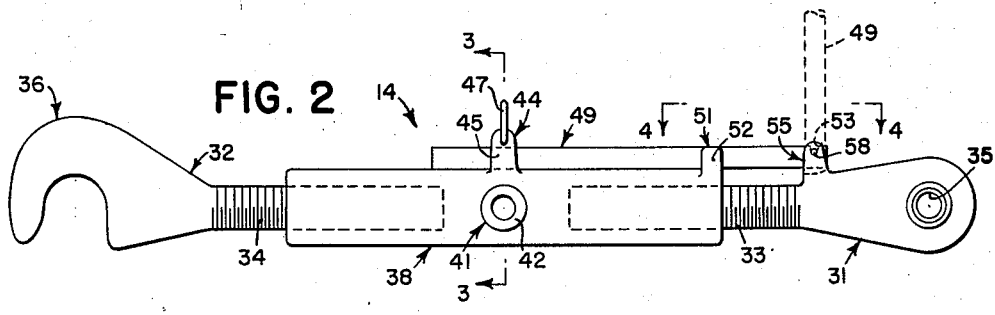
Fig. 2 is an enlarged side view showing the details of the top link of the hitch arrangement shown in Fig. 1.
Figure 3:
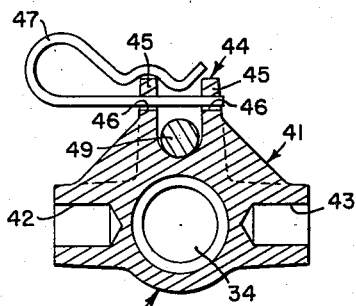
Fig. 3 is a sectional view taken generally along the line 3—3 of Fig. 2.
Figure 4:
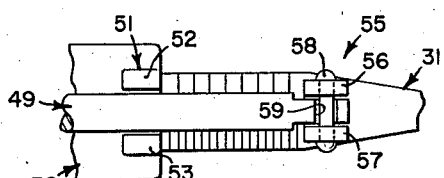
Fig. 4 is a fragmentary plan view of the front portion of the link shown in Fig. 2, corresponding to a view taken along the line 4—4 of Fig. 2.

Referring now to Figs. 2–4, which shows the details of the top link structure 14, the latter comprises front and rear end members 31 and 32 disposed generally in alignment and each having its adjacent or inner end threaded, as indicated at 33 and 34, respectively. The outer or forward end of the end member 31 may be formed to swingably engage a spherical member 35 that forms a connection between the tractor and the front end of the link structure 14. The rear end of the rear end member 32 preferably is formed as a hook-like section 36 to facilitate connection to and disconnection from the implement 10. The two end members 31 and 32 are interconnected by a rotatable sleeve or barrel member 38, end portions of which are threaded to receive the threaded ends 33 and 34, the threaded sections at opposite ends of the barrel being of opposite hand so that rotation of the barrel 38 in one direction will increase the effective length of the link 14 while rotation of the barrel in the other direction will decrease the effective length, as is common in turnbuckle structures of this general nature.

The present invention is particularly concerned with means providing for quick and easy attachment of the turnbuckle, even when under load, and with means for effectively locking the parts against rotation so that the desired adjustment will be retained even under vibration, jars, reversals of stress and other conditions that ordinarily are encountered in agricultural implement service.

As will best be seen in Fig. 3, the generally central portion of the barrel member 38 is formed with an enlarged boss section 41 providing two socket sections 42 and 43 and an upper lug means 44 that includes a pair of laterally spaced apart upwardly extending lugs 45, the upper portions of which are apertured, as at 46, to receive a locking pin 47. The lugs 45 are spaced apart so as to receive therebetween a locking part in the form of a rod 49, that is adapted, as will be described below, to serve a dual function. First, it serves as a handle, when one end is inserted in either one or the other of the sockets 42 and 43, for facilitating the rotation of the barrel member 38 when an adjustment is desired, and, when the part 49 is arranged as shown in Fig. 1, it serves as means for locking the barrel member 38 to the front end member 31 so as to prevent any relative rotation therebetween. Since the rear end member 32 is held against rotation by virtue of its connection with the upper end of the implement mast, the adjustment in the effective length of the link structure 14, by rotating the barrel 38 the requisite amount, will be retained.

For the purpose of locking the front end member 31 to the barrel 38, the front end of the barrel is provided with lug means 51 in the form of a pair of lugs 52 extending generally directly upwardly in laterally spaced apart relation from the front end of the barrel 38. The front end member 31 is also provided with lug means 55 that includes a pair of lugs 56 and 57, also extending upwardly in spaced apart relation and interconnected by a cross pin 58. The associated end of the locking part 49 is provided with a notch 59 so that, as shown in dotted lines in Fig. 2, when the member 49 is disconnected from the barrel member 38, it may be connected with the cross pin 58 on the front lug means 56, 57 and then swung downwardly into a position between the lugs 52 and 53 and between the lugs 45, when the barrel 38 is rotated to bring the lug means thereon into alignment with the lug means on the end member 31, whereupon the member 49 acts to prevent rotation of the barrel member 38. The locking member 49 is then securely retained in position by inserting the spring pin retainer 47 through the openings 46 in the lugs 45, as shown in Fig. 3.

Figure 5:
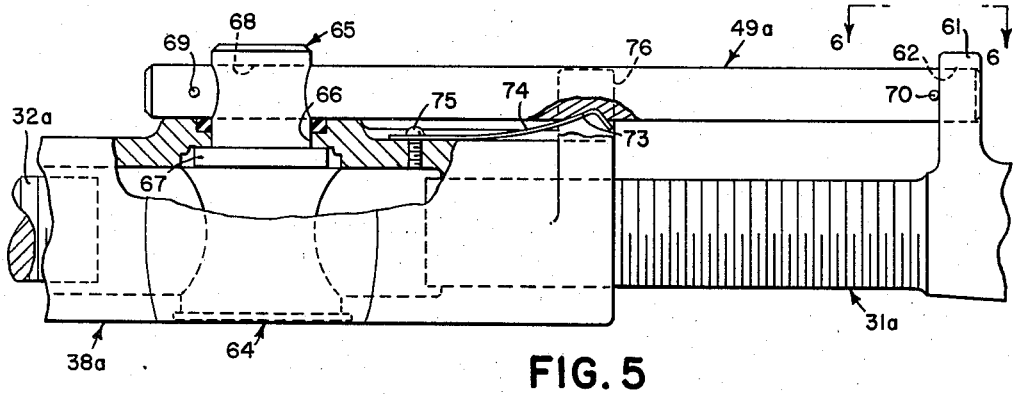
Fig. 5 is a view similar to Fig. 2, showing a modified construction in which the combined handle and locking part is a permanently connected part of the top link, whereas the combined handle and locking part shown in Fig. 2 is separable from the associated parts.
Figure 6:
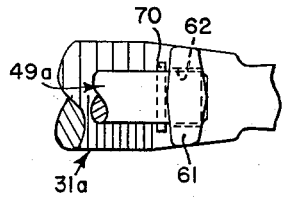
Fig. 6 is a fragmentary plan view of a portion of the top link shown in Fig. 5, taken along the line 6—6 of Fig. 5.

In the form of the invention shown in Fig. 5 the end members 31a and 32a are substantially like those described above, except that the front end member 31a carries lug means in the form of a single lug 61 provided with an aperture 62 extending therethrough. In this form of the invention the barrel member 38a is formed with an enlarged central section 64 shaped internally to receive a stud 65 in rotatable relation. Specifically, the enlarged central section 64 is provided with a radially inwardly extending flange section 66 that overlies an outwardly extending flange section 67 carried by the lower end of the stud 65. The upper or shank section of the latter is apertured, as at 68 and slidably receives a locking part in the form of a straight rod bar 49a, the ends of which are apertured to receive limit pins 69 and 70. The generally central portion of the member or part 49a is notched, as at 73 to receive the angled end of a leaf spring 74, the other end of which is fixed, as by a pin 75, to an adjacent portion of the barrel member 38a. Fig. 5 shows the locked position of the barrel and end member, the barrel 38a also having a lug means in the form of a pair of lugs 76 substantially identical with the lugs 52 and 53 described above. In this form of the invention the locking part 49a is permanently associated with the barrel member 38a, but the latter may be released for rotation by forcibly sliding or shifting the locking part 49a to the left as shown in Fig. 5, against the action of the spring 74, so as to free the forward end of the member 49a from the lug 61. The part 49a may then be swung around, by virtue of the rotatable pivot member 65, into a transverse position relative to the barrel 38a, whereupon the part 49a may serve as a handle for turning the barrel 38a. After the desired adjustment has been made, the part 49a may be returned to the position shown in Fig. 5, which locks the barrel 38a against undesired rotation.

Figure 7:
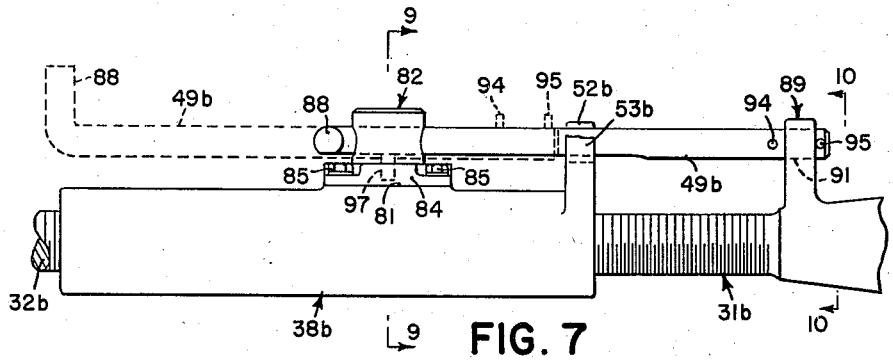
Fig. 7 is a view similar to Fig. 2, showing another modified form of the present invention.
Figure 8:
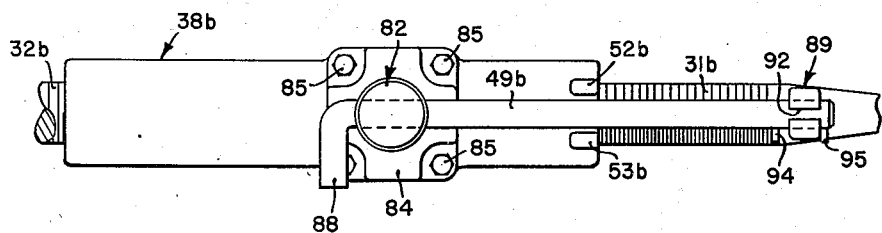
Fig. 8 is a plan view of the adjustable link shown in Fig. 7.

The form of the invention shown in Fig. 7 is similar to that shown in Fig. 5 except that the central portion of the barrel member 38b is provided with a flat upper face, shown at 81 in Fig. 8, that receives the lower face of a pivoted stud 82, having a flange 83 that is a part of the means holding the stud 82 on the barrel or sleeve member 38b, which means also includes a securing plate 84 fixed in place by cap screws 85. The upper or shank portion of the pivot stud 82 is apertured, as at 87, to receive a locking member 49b which, in this form of the invention, is provided with an upturned end 88 forming a handle for manipulating the member 49b. The forward end of the barrel section 38b is provided with lugs 52b and 53b which are spaced apart to receive a rod member 49b, and the end of the member 49b is adapted to be disposed in lug means 89 carried by the forward end member 31b. The lug means 89, in this form of the invention, is provided with a through opening 91 and a slot 92 extending from the opening through the upper end portion of the lug 89. The forward end of the locking part 49b carries a pair of axially spaced apart pins 94 and 95 that extends outwardly from one side only of the member 49b. By turning the handle section 88 upwardly, the pins 94 and 95 are disposed in upper position, and then the part 49b may be shifted forwardly in the pivot stud opening 87, the forwardmost pin 95 moving forwardly through the notch 42. The locking part 49b is then turned through 90°, disposing the locking pins 94 and 95 on both sides of the forward lug 89 so that the part 49b is held against axial displacement. In order to prevent the part 49b from rotating back into a position where the handle section 88 extends upwardly, a spring biased detent 97 is mounted in the pivot stud 82 and cooperates with a flattened section 98 formed on the part 49b. The bias of the detent 97 may be overcome whenever required by manual manipulation of the handle section 88.

If desired, the spring biased detent 97 may be omitted, and retaining spring means, such as are shown in Fig. 5, employed in lieu of the detent 97 to hold the locking part in position.

Referring now to Figs. 11 and 12, in this form of the invention the forward end of the locking part, shown at 49c, is provided with an abutment ring 101, and associated lug means 102 (Fig. 12) is provided with a through opening 103 and upper and lower slotted portions 104 and 105. The lug 102 is also provided with a crossbore in which a pin 106 is disposed, the pin 106 serving as anchoring means for a rod-engaging spring member 107. The latter part has a loop section embracing the pin 106 and outwardly flaring end portions 108 and 109 that are disposed in the slots 104 and 105 and shaped to engage the ring 101, when the part 49c is moved into position in the lug 102.

The form of the invention shown in Fig. 13 incorporates a front end member 31d having an upwardly extending lug means 112 provided with a generally transverse downwardly extending slot 113 that receives a plate 114 having bent upper and lower ends 115 and 116 that provide retaining means for holding in the slot 113 a generally U-shaped rod-engaging spring member 117, opposite leg portions of which extend upwardly along opposite sides of a through opening 118 that receives the front end of the associated locking part 49d. The forward end of the latter part is formed with a bulbous end section, as indicated at 121, and a stop ring 122 that limits the forward displacement of the rod member 49d. The leg portions of the U-shaped spring 117 are adapted to snap back behind the large diameter portion of the section 121 for releasably holding the locking member 49d in its barrel-receiving position.

While we have shown and described above the preferred structure in which the principles of the present invention have been incorporated, it is to be understood that our invention is not to be limited to the particular details, shown and described, but that, in fact, widely different means may be employed in the practice of the broader aspects of our invention.

What we claim, therefore, and desire to secure by Letters Patent is:

1. In a tractor-implement hitch system, an adjustable top link adapted to extend between the implement and the tractor, comprising a pair of aligned end members adapted to be connected at their outer ends with the implement and tractor, respectively, the inner ends of said members being oppositely threaded, an interiorly threaded barrel member operatively connected with the threaded portions of said end members, a locking part movably mounted on the barrel member and connectible therewith in one position, extending transversely thereof, to facilitate turning said barrel member to effect an adjustment of the effective length of said link, lug means on said barrel member and one of said end members to receive said locking part in a second position and said lug means engaging said part in said second position to prevent said barrel member and end member from turning one relative to the other, and means carried by said lug means to hold said locking part in its second position.

2. The invention set forth in claim 1, further characterized by said locking part being mounted on the barrel member for both pivotal and axially shifting movement relative thereto, and the lug means on said one member comprising a pair of part-receiving means accommodating axial movement of said part into and out of interengaging relation with the part-receiving means on the associated end member.

3. The invention set forth in claim 2, further characterized by spring means carried by said barrel member and engageable with said part to hold the latter in locking position.

4. In a tractor-implement hitch system, an adjustable top link adapted to extend between the implement and the tractor, comprising a pair of aligned end members adapted to be connected at their outer ends, with the implement and tractor, respectively, the inner ends of said members being oppositely threaded, an interiorly threaded barrel member operatively connected with the threaded portions of said end members, a socket on the generally central portion of said barrel member, a locking part insertable in said socket to rotate said barrel, means on one end portion of said barrel member and the adjacent end member to retainably receive said part, when the latter is detached from said socket, to hold the barrel member and said adjacent end member against relative movement, the means on said one end portion of the barrel member being spaced axially of said socket, and means engageable with said part to hold the latter in said part-receiving means.

5. In a tractor-implement hitch system, an adjustable top link adapted to extend between the implement and the tractor, comprising a pair of aligned end members adapted to be connected at their outer ends with the implement and tractor, respectively, the inner ends of said members being oppositely threaded, an interiorly threaded barrel member operatively connected with the threaded portions of said end members, a locking part carried by and disposable in a position lying generally longitudinally of the barrel member and one of said end members, lug means on said barrel member and one of said end members to receive said locking part and prevent said barrel member and said one end member from turning one relative to the other, and means carried by said lug means to hold said locking part in locking position.

6. In a tractor-implement hitch system, an adjustable top link adapted to extend between the implement and the tractor, comprising a pair of aligned end members adapted to be connected at their outer ends, with the implement and tractor, respectively, the inner ends of said members being oppositely threaded, an interiorly threaded barrel member operatively connected with the threaded portions of said end members, two axially spaced apart pairs of lugs on said barrel member, a locking part movably connected with the barrel member, the lugs being spacially arranged to receive said locking part and dispose the latter generally longitudinally of said barrel member, a pair of part-receiving lugs on one of said end members to receive said part in said longitudinal position, and removable means connected with one of said pairs of lugs and engageable with said part to hold the latter in said longitudinal position.

7. In a tractor-implement hitch system, an adjustable top link adapted to extend between the implement and the tractor, comprising a pair of aligned end members adapted to be connected at their outer ends, with the implement and tractor, respectively, the inner ends of said members being oppositely threaded, an interiorly threaded barrel member operatively connected with the threaded portions of said end members, lug means on said barrel member and one of said end members to receive said locking part, said lug means and said part serving to prevent said barrel member and end member from turning one relative to the other, said locking part being rotatably received by said lug means, and means on said part and lug means and responsive to rotation of said part for releasably holding the latter in locking position.

8. The invention set forth in claim 7, further characterized by spring means acting against said part to restrain rotation of the latter in said lug means.

9. The invention set forth in claim 8, further characterized by said spring means comprising a spring-biased detent carried by said barrel member and biased to move against said part.

10. In a tractor-implement hitch system, an adjustable top link adapted to extend between the implement and the tractor, comprising a pair of aligned end members adapted to be connected at their outer ends, with the implement and tractor, respectively, the inner ends of said members being oppositely threaded, an interiorly threaded barrel member operatively connected with the threaded portions of said end members, a stud rotatably carried by said barrel member and having a shank section disposed exteriorly of said barrel member and apertured, a locking part disposed in the aperture of said stud and shiftable therein, lug means on one end of said barrel member, lug means on the end member adjacent said first lug means, both of said lug means being adapted to receive said locking part when the latter is disposed longitudinally of said barrel member, and means engageable with said locking part to hold the latter in engagement with both of said lug means.

11. In a tractor-implement hitch system, an adjustable top link adapted to extend between the implement and the tractor, comprising a pair of aligned end members adapted to be connected at their outer ends, with the implement and tractor, respectively, the inner ends of said members being oppositely threaded, an interiorly threaded barrel member operatively connected with the threaded portions of said end members, a stud rotatably carried by said barrel member and having a shank section disposed exteriorly of said barrel member and apertured, a locking part disposed in the aperture of said stud and shiftable therein, lug means on one end of said barrel member, lug means on the end member adjacent said first lug means, both of said lug means being adapted to receive said locking part when the latter is disposed longitudinally of said barrel member, and means carried by the lug means on said end member and engageable with said locking part to hold the latter in engagement with both of said lug means.

12. In a tractor-implement hitch system, an adjustable top link adapted to extend between the implement and the tractor, comprising a pair of aligned end members adapted to be connected at their outer ends, with the implement and tractor, respectively, the inner ends of said members being oppositely threaded, an interiorly threaded barrel member operatively connected with the threaded portions of said end members, a stud rotatably carried by said barrel member and having a shank section disposed exteriorly of said barrel member and apertured, a locking part disposed for both rotary and axial shifting movement in the aperture in said stud, lug means on one end of said barrel member, lug means on the end member adjacent said first lug means, both of said lug means being adapted to receive said locking part when the latter is disposed longitudinally of said barrel member, means carried by the outer end portion of said part and engageable with and disengageable from the lug means on said end member by rotation of said part in said stud, and detent means carried by said barrel and engageable with said part to hold the latter against rotation in said stud when the means at the outer end portion of said part engages the lug means on said end member.

13. In a tractor-implement hitch system, an adjustable top link adapted to extend between the implement and the tractor, comprising a pair of aligned end members adapted to be connected at their outer ends, with the implement and tractor, respectively, the inner ends of said members being oppositely threaded, an interiorly threaded barrel member operatively connected with the threaded portions of said end members, a first pair of lugs carried by one end of said barrel member, a second pair of lugs carried by the end member adjacent said first pair of lugs, a cross pin carried by said first pair of lugs, a third pair of lugs carried by the generally central portion of said barrel member, a locking rod disposable in said pairs of lugs to lock the barrel member against rotation, a notch formed on one end of said locking rod to engage said cross pin and thereby prevent axial shifting of said locking rod relative to said barrel member and said lugs, and means releasably connected with said third pair of lugs to hold said locking rod in position in said pairs of lugs.

14. An adjustable link comprising a pair of relatively shiftable end parts, a rotatable sleeve member having threaded connections with said parts, said connections being of opposite hand, a locking member mounted for longitudinal sliding movement axially on said sleeve member, and an apertured section on one of said end parts to receive said locking member when the latter is shifted along said sleeve member into engagement with said apertured section.

15. An adjustable link member for use in agricultural machines and the like, comprising a pair of generally axially alined relatively movable parts, a rotatable member connected with said parts and adapted to be rotated for shifting one of said parts relative to the other, a swivel movably mounted on said rotatable member for movement relative thereto about a transverse axis, a handle member shiftably disposed in said swivel, a bifurcated boss on said rotatable member adjacent one end and adapted to slidably receive said handle member, and means on the one of said pair of parts that lies adjacent said bifurcated boss to slidably receive said handle member when the latter is disposed in said bifurcated boss and shifted longitudinally of the rotatable member into said last mentioned means for locking said rotatable member against rotation.

16. An adjustable link comprising a pair of relatively shiftable end parts, a rotatable sleeve member having oppositely threaded connection with said parts, a swivel carried by said sleeve member for rotary movement relative thereto about a transverse axis, a locking member movably carried by said swivel and slidable relative to the latter in a direction transversely of said axis and longitudinally of said sleeve member, and abutment sections carried by said sleeve member and one of said end parts and the abutment on the sleeve member being located thereon adjacent the end thereof that lies contiguous to said one end part, said abutment sections being adapted to be brought into alignment when said sleeve member is rotated into one position, said abutment sections including means slidably receiving said locking member.

17. An adjustable link comprising a pair of screw threaded members disposed generally in alignment and having exterior oppositely threaded sections, an internally threaded sleeve member receiving the threaded sections of said members, whereby they may be extended or retracted by rotation of said sleeve member, a part disposable in a position longitudinally of said sleeve member, a pair of guide means therefor, one on the central and the other on one end portion of said sleeve member, said part being shiftable longitudinally in said two guide means, and means on one of the threaded members adjacent said one end portion of the sleeve member for receiving the adjacent end of said part and thereby locking said sleeve member against rotation.

18. An adjustable link comprising a pair of screw threaded members disposed generally in alignment and having exterior oppositely threaded sections, an internally threaded sleeve member receiving the threaded section of said members, whereby they may be extended or retracted by rotation of said sleeve member, an operating part both shiftably and rotatably mounted on said sleeve member and rotatable into a first position, disposed transversely of said sleeve member, for rotating the latter and disposable in a second position longitudinally of said sleeve member and adjacent one of said screw threaded members, means on one of said screw threaded members to receive one end of the operating part when the latter lies longitudinally of said sleeve member and is shifted into engagement with said one of said screw threaded members, and spring means carried on said sleeve member for releasably holding said operating part in connection with said one screw threaded member.

References Cited in the file of this patent

UNITED STATES PATENTS

| Number | Name | Date |
|---|---|---|
| 1,169,906 | Anderson | Feb. 1, 1916 |
| 1,354,322 | Madrin | Sept. 28, 1920 |

FOREIGN PATENTS

| Number | Country | Date |
|---|---|---|
| 288,619 | Germany | Nov. 10, 1915 |
| 311,269 | Germany | Mar. 12, 1919 |